United States Patent
Nejedly et al.

(10) Patent No.: US 11,286,943 B2
(45) Date of Patent: Mar. 29, 2022

(54) SINGLE-STAGE COMPRESSOR WITH THRUST LOAD SUPPRESSION SECTION

(71) Applicant: Garrett Transportation I Inc., Torrance, CA (US)

(72) Inventors: Milan Nejedly, Brno (CZ); Ryoken Matsuzaki, Torrance, CA (US); Jeffrey Lotterman, Los Angeles, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 296 days.

(21) Appl. No.: 16/400,469

(22) Filed: May 1, 2019

(65) Prior Publication Data
US 2020/0347852 A1    Nov. 5, 2020

(51) Int. Cl.
| | |
|---|---|
| F04D 29/051 | (2006.01) |
| F04D 25/06 | (2006.01) |
| F04D 29/08 | (2006.01) |
| F04D 27/00 | (2006.01) |
| F04D 29/40 | (2006.01) |
| F04D 29/057 | (2006.01) |

(52) U.S. Cl.
CPC ......... *F04D 29/0513* (2013.01); *F04D 25/06* (2013.01); *F04D 27/009* (2013.01); *F04D 29/083* (2013.01); *F04D 29/057* (2013.01); *F04D 29/0516* (2013.01); *F04D 29/403* (2013.01); *F05B 2240/52* (2013.01)

(58) Field of Classification Search
CPC .......................... F04D 29/002; F04D 29/0516
See application file for complete search history.

(56) References Cited

U.S. PATENT DOCUMENTS

| | | | | |
|---|---|---|---|---|
| 3,359,731 | A | * 12/1967 | Anderson | ............. F04D 29/057 60/657 |
| 4,715,778 | A | 12/1987 | Katayama et al. | |
| 4,884,942 | A | * 12/1989 | Pennink | ............. F16C 32/0692 415/104 |

(Continued)

FOREIGN PATENT DOCUMENTS

| | | |
|---|---|---|
| GB | 2462635 A | 2/2010 |
| JP | 2011202589 A | 10/2011 |
| WO | 2011078680 A1 | 6/2011 |

*Primary Examiner* — Nathan C Zollinger
*Assistant Examiner* — Timothy P Solak
(74) *Attorney, Agent, or Firm* — Lorenz & Kopf LLP

(57) ABSTRACT

A compressor device includes a housing and a shaft supported for rotation within the housing. The compressor device includes a compressor section with a compressor wheel. Also, the compressor device includes a thrust suppression section with a chamber and a thrust balance body disposed within the chamber. Moreover, the compressor device includes a motor configured to drivingly rotate the shaft, the compressor wheel, and the thrust balance body. The thrust balance body divides the chamber into a first sub-chamber and a second sub-chamber. Additionally, the compressor device includes a bleed air system that fluidly connects the compressor section and the thrust suppression section. The bleed air system is configured to bleed air from the compressor section, through the first sub-chamber, to the second sub-chamber, pressurizing the first sub-chamber and generating a counterbalancing thrust load that counterbalances a compressor thrust load on the shaft.

20 Claims, 5 Drawing Sheets

(56) References Cited

U.S. PATENT DOCUMENTS

| | | | |
|---|---|---|---|
| 5,791,868 A | 8/1998 | Bosley et al. | |
| 2001/0022940 A1* | 9/2001 | Funke | F04D 29/122 417/407 |
| 2004/0005228 A1* | 1/2004 | Agrawal | F04D 29/053 417/365 |
| 2015/0308443 A1* | 10/2015 | Stalder | F04D 27/02 415/1 |
| 2016/0298648 A1* | 10/2016 | Graham | F04D 29/0513 |

* cited by examiner

SINGLE-STAGE COMPRESSOR WITH THRUST LOAD SUPPRESSION SECTION

TECHNICAL FIELD

The present disclosure generally relates to a single-stage compressor and, more particularly, relates to a single-stage compressor with a thrust load compensation section.

BACKGROUND

Various systems include a compressor for supplying compressed fluid. For example, fuel cell systems often include a fuel cell compressor for compressing air before it is fed to the fuel cell stack. This can increase operating efficiency of the fuel cell system.

However, conventional compressors may suffer from various deficiencies. For example, some compressors may be too bulky, too heavy, or too complex for some applications. Also, the bearings used in some conventional compressors may be a source of contamination. Furthermore, some compressors may have a load bearing capacity that limits their usefulness and/or operating efficiency.

Thus, it is desirable to provide a compressor that is compact and that is less complex than conventional compressors. Also, it is desirable to provide a compressor bearing that is less likely to contaminate the compressor. Moreover, it is desirable to provide a compressor with higher load bearing capacity than conventional compressors. Other desirable features and characteristics of the present disclosure will become apparent from the subsequent detailed description and the appended claims, taken in conjunction with the accompanying drawings and this background discussion.

BRIEF SUMMARY

In one embodiment, a compressor device is disclosed that includes a housing and a shaft supported for rotation within the housing. The compressor device further includes a compressor section with a compressor wheel that is fixed to the shaft for rotation therewith. Moreover, the compressor device includes a thrust suppression section with a chamber and a thrust balance body disposed within the chamber. The thrust balance body is fixed to the shaft for rotation therewith. Additionally, the compressor device includes a motor configured to drivingly rotate the shaft, the compressor wheel, and the thrust balance body. The thrust balance body divides the chamber into a first sub-chamber and a second sub-chamber. Furthermore, the compressor device includes a bleed air system fluidly connecting the compressor section and the thrust suppression section and configured to bleed air from the compressor section, through the first sub-chamber, to the second sub-chamber, pressurizing the first sub-chamber and generating a counterbalancing thrust load that counterbalances a compressor thrust load on the shaft.

In another embodiment, a single-stage, motorized compressor device is disclosed having a housing and a rotating group that includes a shaft, a compressor wheel fixed to the shaft, and a thrust balance body fixed to the shaft. The compressor device also includes an air bearing that supports rotation of the rotating group within the housing. Furthermore, the compressor device includes a motor that drives rotation of the rotating group within the housing and a bleed air system. The housing and the compressor wheel cooperatively define a compressor section of the compressor device. The housing and the thrust balance body cooperatively define a thrust suppression section of the compressor device and cooperatively define a chamber within the thrust suppression section. The bleed air system fluidly connects the compressor section and the chamber of the thrust suppression section. The bleed air system is configured to bleed air from the compressor section and pressurize the chamber and apply a counterbalancing thrust load on the thrust balance body. The counterbalancing thrust load counterbalances a compressor thrust load on the rotating group.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a compressor with a thrust load compensation arrangement. The thrust compensation arrangement may include an air bleed passage configured to receive bleed air from the compressor airflow path. The bleed air may be directed through the thrust load compensation arrangement to compensate for thrust loads of the compressor wheel on the rotating group. In other words, the thrust compensation arrangement may reduce or counteract these loads. Accordingly, the compressor may include a relatively simple bearing, such as an air bearing. This can provide cost savings and efficiencies without detrimentally affecting performance. Furthermore, the compressor may be configured as a single-stage compressor that is compact and uncomplicated in design and assembly.

Figure 1:
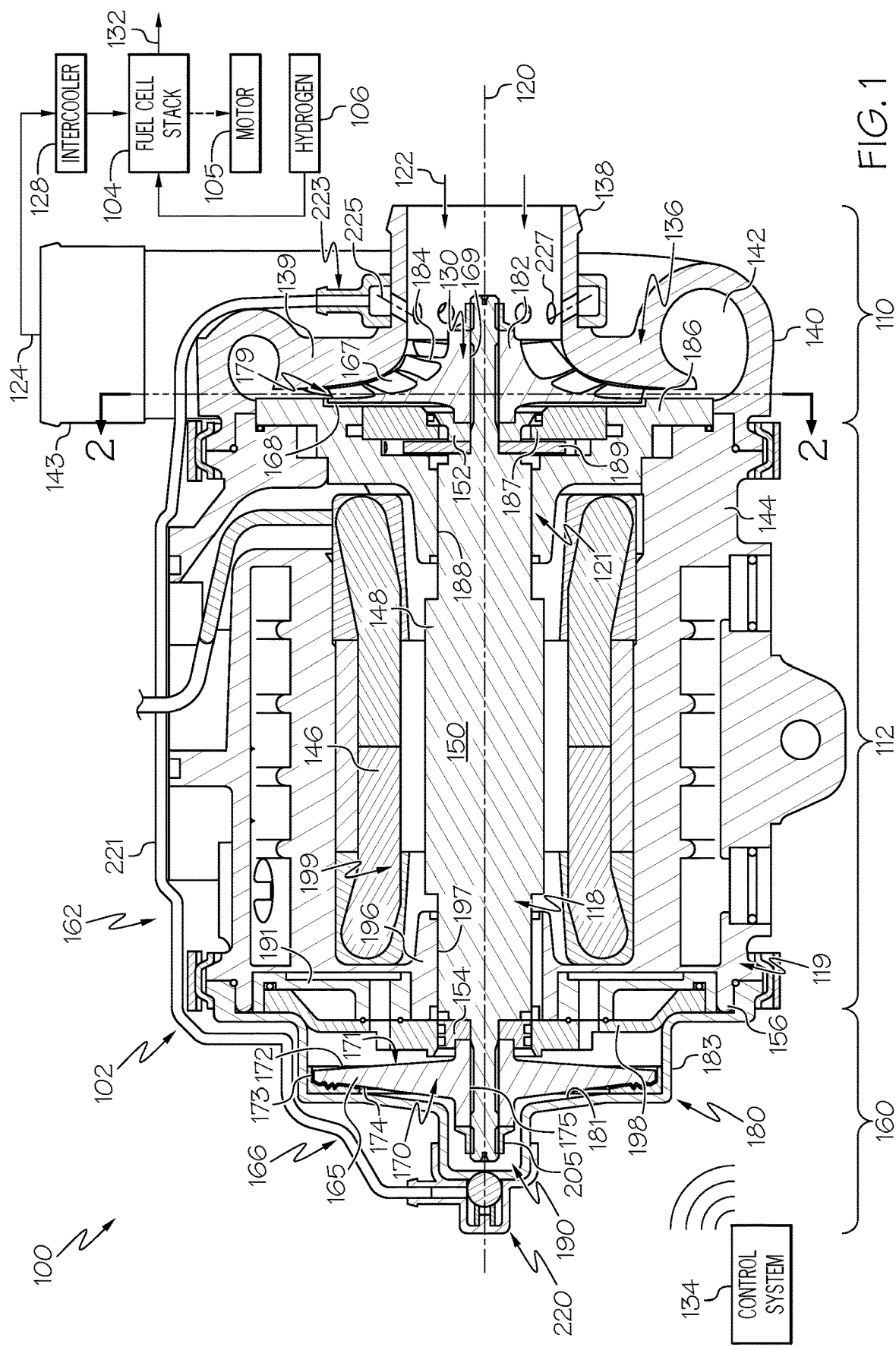
FIG. 1 is a schematic view of a fuel cell system with a charging device according to example embodiments of the present disclosure.

FIG. 1 is a schematic view of a fuel cell system 100 with an example charging device 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied from the charging device 102 to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the charging device 102. The charging device 102 may be configured as an electric compressor device (i.e., electric supercharger) with a single-stage compressor in some embodiments.

As shown in FIG. 1, the charging device 102 may generally include a rotating group 118 and a housing 119. The rotating group 118 may include a shaft 150 and various other components that are fixedly supported on the shaft 150 for rotation within the housing 119 by one or more bearings 121. In some embodiments, the bearing(s) 121 may be configured as a plain bearing, an air bearing, and/or an oil-less bearing.

The charging device 102 may define a motor section 112. The motor section 112 may include an electric motor 199 that includes a stator 146 and a rotor 148. The rotor 148 may be fixed to the shaft 150. The stator 146 may be supported and housed within the housing 119 and may drivingly rotate the rotor 148 and other elements of the rotating group 118 about an axis 120.

The charging device 102 may also include a compressor section 110. In some embodiments, the compressor section 110 may be the sole (only) compressor section of the charging device 102. Accordingly, the charging device 102 may be relatively compact. The compressor section 110 may include a compressor wheel 130, which is fixed to a longitudinal end of the shaft 150. As will be discussed, the compressor wheel 130 and portions of the housing 119 cooperate to define the compressor section 110. The motor 199 may drivingly rotate the compressor wheel 130 about the axis 120 within the housing 119 of the compressor section 110. Accordingly, an inlet airstream (represented by arrows 122) may be compressed by the compressor section 110, and a compressed airstream (represented by arrow 124) may be directed to an intercooler 128 and then to the fuel cell stack 104 for boosting the operating efficiency of the fuel cell system 100.

Furthermore, an exhaust gas stream (represented by arrow 132) from the fuel cell stack 104 may be exhausted to atmosphere as represented in FIG. 1. Stated differently, the exhaust gas stream 132 may be directed away from the charging device 102. Thus, the charging device 102 may be a turbine-less compressor device that is driven solely by the electric motor 199 in some embodiments. In other embodiments, the exhaust gas stream 132 may be directed back toward the charging device 102, for example, to drive rotation of a turbine wheel that is fixed to the shaft 150. This may, in turn, drive rotation of the compressor wheel 130, for example, to assist the electric motor 199.

Various components of the fuel cell system 100 may be controlled by a control system 134. The control system 134 may be a computerized system with a processor, various sensors, and other components for electrically controlling operation of the fuel cell stack 104, the motor 199, and/or other features of the system 100. In some embodiments, the control system 134 may define or may be part of the electrical control unit (ECU) of a vehicle.

It will be appreciated that, during operation, aerodynamic loads may be generated at the compressor section 110. For example, thrust loads generated by the compressor wheel 130 may tend to shift the rotating group 118 axially along the axis 120 (to the right side of the page in FIG. 1). The bearing(s) 121 can support the rotating group 118, however, and can resist and limit axial shifting due to thrust loading.

Furthermore, the charging device 102 may include a load suppression section 160 in some embodiments. The motor section 112 may be disposed axially between the load suppression section 160 and the compressor section 110 in some embodiments. The load suppression section 160 may be configured to compensate for thrust loads generated at the compressor section 110 on the shaft 150. For example, as will be discussed in detail, the load suppression section 160 may generate a counterbalancing thrust force that counterbalances the thrust load at the compressor section 110 on the shaft 150. Features of the load suppression section 160 may also compensate for radial loads generated at the compressor section 110 as will be discussed. Therefore, the load suppression section 160 may allow the charging device 102 to operate at high speeds and provide high efficiency operation of the charging device 102. Also, the bearing(s) 121 included can be lighter-duty, less expensive, and less complex bearing without detrimentally affecting performance of the charging device 102 because of the load compensation provided by the load suppression section 160.

The charging device 102 may additionally include a bleed air system 162. The bleed air system 162 may fluidly connect the compressor section 110 and the load suppression section 160. In some embodiments, the bleed air system 162 may include one or more feed lines 164 (FIG. 3), which fluidly connect the compressor section 110 to the load suppression section 160. Accordingly, bleed air from the compressor section 110 may flow to and pressurize the load suppression section 160 to generate the counterbalancing load as will be discussed. Furthermore, in some embodiments, the bleed air system 162 may include a return line 166 (FIG. 1), which fluidly connects the load suppression section 160 to the compressor section 110. Accordingly, in some embodiments, the bleed air system 162 may bleed air from the compressor section 110 to the load suppression section 160 and return the bleed air back to the compressor section 110. Thus, the bleed air system 162 may be a closed system in some embodiments. In other embodiments, however, the bleed air system 162 may be an open system that exhausts bleed air from the load suppression section 160 to ambient or to another destination. Additionally, in some embodiments, the bleed air system 162 may be a passive system that operates to automatically balance thrust loads in rotating group 118.

It will be appreciated that the load suppression section 160 and the bleed air system 162 collectively define a so-called thrust load compensation arrangement. These features may vary from the illustrated embodiments without departing from the scope of the present disclosure. Also, these features allow the bearing(s) 121 to be simplified. For example, one or more bearings 121 may be air bearings in some embodiments. Thus, the charging device 102 may maintain heavy duty operation for long operating lifetimes. Also, the charging device 102 can be manufactured and repair inexpensively and in a time efficient manner because of the features of the present disclosure.

Figure 2:
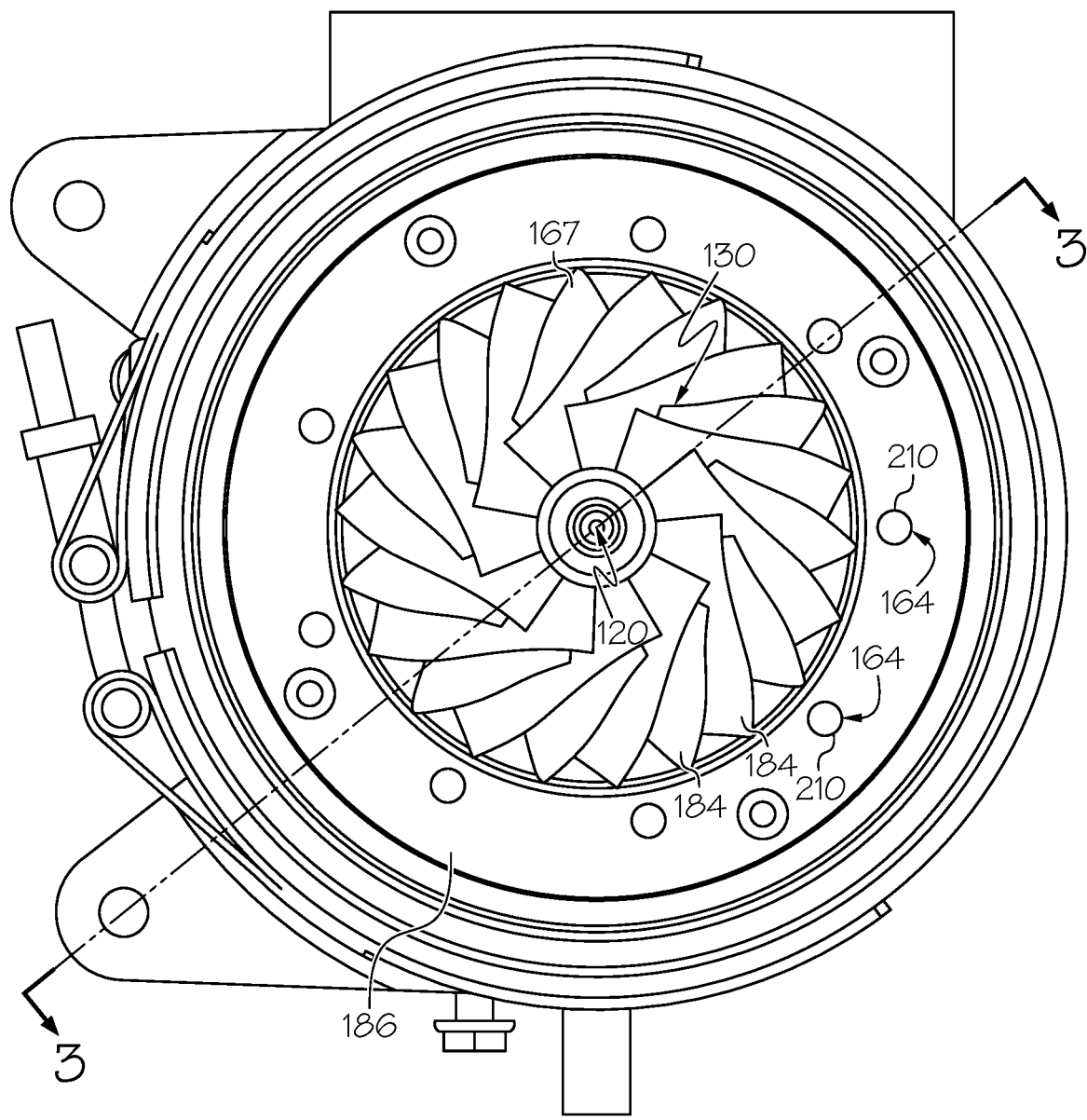
FIG. 2 is an end section view of the charging device taken along the line 2-2 of FIG. 1.
Figure 3:
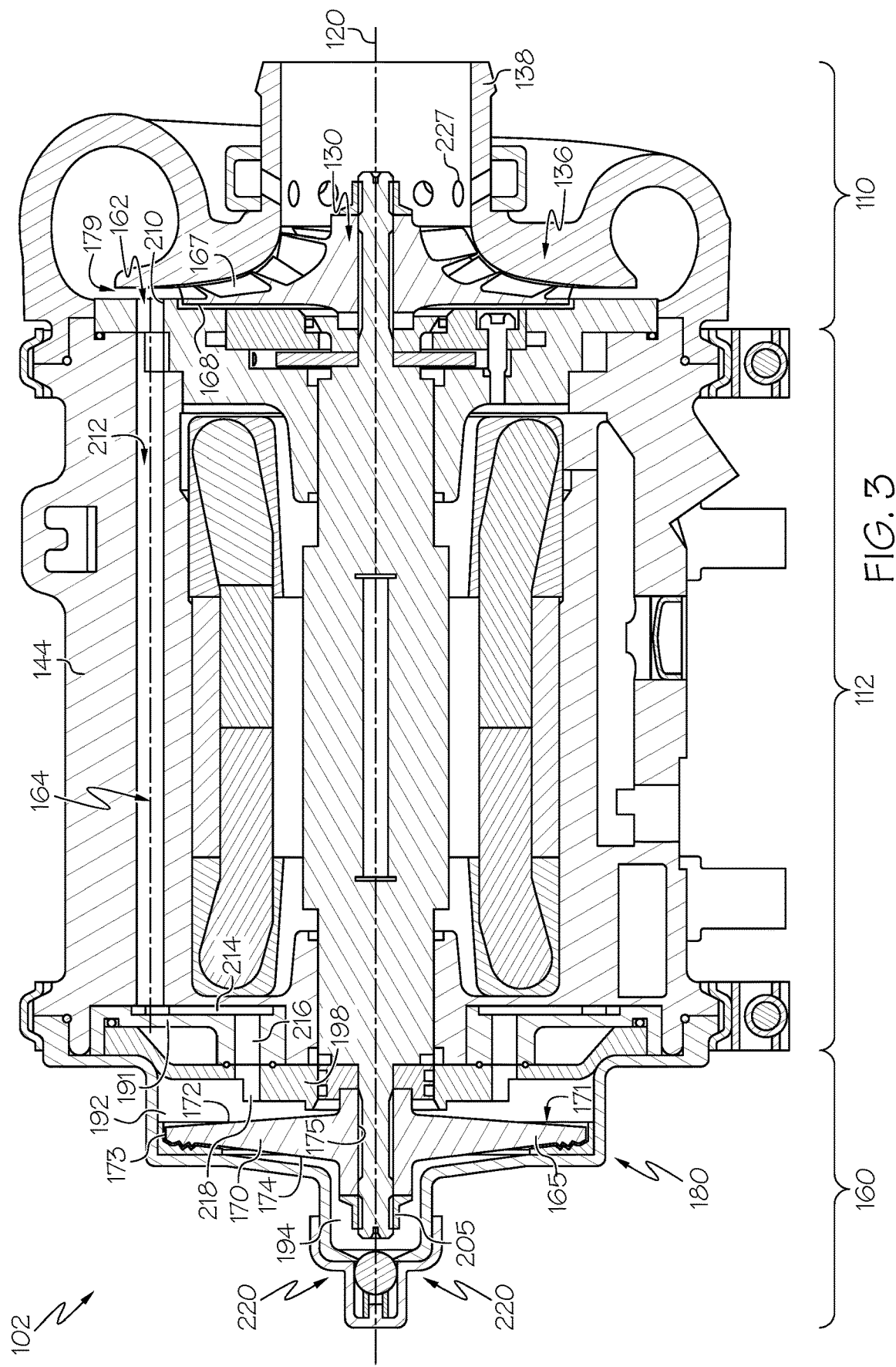
FIG. 3 is an axial section view of the charging device taken along the line 3-3 of FIG. 2.

Referring now to FIGS. 1-3, the compressor wheel 130 of the rotating group 118 will be discussed in greater detail according to example embodiments. The compressor wheel 130 may be substantially centered on the axis 120 and fixed to one end of the shaft 150. The compressor wheel 130 may include a front face 167 and a back face 168. The bulk of the compressor wheel 130 may be defined by a support structure 182. The support structure 182 may be frusto-conic or otherwise tapered along the axis 120 from the front face 166 to the back face 168, and the back face 168 may be disposed substantially normal to the axis 120. The front face 167 may include a plurality of blades 184 (FIG. 2). The blades 184 may be relatively thin members that project from the front face 167. The blades 184 may project radially away from the axis 120. The blades 184 may also extend helically about the axis 120. The compressor wheel 130 may include a bore 169 that receives the shaft 150 to be fixed to one terminal end of the shaft 150. The front face 167 may face away from the motor section 112. The support structure 182 may be dimensioned and balanced for smooth rotation about the axis 120.

The rotating group 118 may also include a thrust balance body 170. The thrust balance body 170 may be substantially centered on the axis 120 and fixed to the end of the shaft 150 that is opposite the compressor wheel 130. The thrust balance body 170 may include a balancing disc 165 that is rounded and flat. The balancing disc 165 may include an outer surface 171 with a front face 172, a radial area 173, and a back face 174. The balancing disc 165 may include a bore 175 that receives the shaft 150 to be fixed thereto, in the load suppression section 160, with the front face 172 facing toward the motor section 112. A nut 205 may be included that fixes the balancing disc 165 on the shaft 150. The balancing disc 165 may be dimensioned and balanced for smooth rotation about the axis 120. Also, the balancing disc 165 may be supported to rotate as a unit with the shaft 150 and the compressor wheel 130. As will be discussed, the balancing disc 165 and the compressor wheel 130 may balance each other during such rotation such that overall thrust and/or radial loads of the charging device 102 are reduced.

Example embodiments of the housing 119 of the charging device 102 will now be discussed in greater detail with reference to FIGS. 1-3. As shown, the housing 119 may include a motor casing 144 that is hollow and cylindrical. The motor casing 144 may extend lengthwise along the axis 120, between the compressor stage 110 and the load suppression section 160. The motor casing 144 may house the stator 146. Thus, the stator 146 may be fixed inside the motor casing 144, whereas the rotor 148 may be fixed on the shaft 150 of the rotating group 118 and may be received within the stator 146.

Moreover, the housing 119 may include a compressor housing member 136, which defines an axial inlet 138, a shroud member 139, and a volute member 140. The axial inlet 138, shroud member 139, and volute member 140 may be attached together in a unitary, one-piece compressor housing member 136. The volute member 140 may be fixedly attached on one end of the motor casing 144 or other portions of the motor section 112. The axial inlet 138 may be tubular, straight, and centered on the axis 120. The shroud member 139 may be inversely shaped according to the front face 167 of the compressor wheel 130 such that the compressor wheel 130 and the compressor housing member 136 cooperatively define the compressor section 110. The shroud member 139 may oppose the blades 184 of the compressor wheel 130 to collectively define a diffuser area 179 of the compressor section 110. The diffuser area 179 may turn the inlet airstream 122 radially outward and into the volute passage 142. The volute member 140 may define a volute passage 142 therein that extends about the axis 120. As will be discussed, the inlet airstream 122 may flow into the inlet 138, flow through the diffuser arear 179, and flow into the volute passage 142 during operation of the charging device 102. The volute member 140 may also define an outlet 143 (FIG. 1). From the outlet 143 of the volute passage 142, the airstream 124 may flow to the intercooler 128 and, then, to the fuel cell stack 104.

The housing 119 may further include a thrust suppression housing 180. The thrust suppression housing 180 may be a thin-walled, rigid, unitary, one-piece member with an inner surface 181 and an outer surface 183. Portions of the thrust suppression housing 180 may be substantially inverse to the radial area 173, and the back face 174 of the balancing disc 165 such that the balancing disc 165 and the thrust suppression housing 180 cooperatively define the load suppression section 160. The thrust suppression housing 180 may be fixedly attached over an end flange 156 of the motor casing 144. Thus, the thrust suppression housing 180 may be disposed opposite the compressor section 110 in the axial direction. The thrust suppression housing 180 and the motor casing 144 (as well as one or more interior components of the charging device 102) may collectively define one or more chambers 190 within the load suppression section 160. The chamber 190 may define part of the bleed air system 162 as will be discussed.

As mentioned above, and as shown in FIGS. 1-3, the bearing(s) 121 of the charging device 102 may include air bearings. Accordingly, the bearings 121 may include a first bearing housing 186 proximate the compressor section 110. The bearings 121 may also include a second bearing housing 196 proximate the load suppression section 160. The first bearing housing 186 may be cap-shaped and may support a first journal bearing 188, a thrust bearing 187, a thrust disc 189, which support rotation of the rotating group 118 relative to the housing 119. The second bearing housing 196 may extend radially inward from the motor casing 144 and may support a second journal bearing 197, which further supports rotation of the rotating group 118 relative to the housing 119.

Additionally, the charging device 102 may further include a first end plate 191. The first end plate 191 may be a thin-walled member that is received within the end flange 156 of the motor casing 144. The first end plate 191 may also cover over the axial end of the stator 146, the motor casing 144, and/or the second bearing housing 196.

Furthermore, the charging device 102 may include a second end plate 198. The second end plate 198 may be a thin-walled member that is received within the end flange 156 of the motor casing 144. The second end plate 198 may cover over the first end plate 191.

The charging device 102 may further include a first seal plate 152 proximate the compressor section 110. The first seal plate 152 may include a bore that receives the shaft 150. The first seal plate 152 may also be received within a bore of the thrust bearing 187. The first seal plate 152 may also be axially disposed between the back face 168 of the compressor wheel 130 and the thrust disc 189. Moreover, the charging device 102 may include a second seal plate 154 proximate the load suppression section 160. The second seal plate 154 may include a bore that receives the shaft 150. The second seal plate 154 may also be received within a bore of the second end plate 198.

Figure 4:
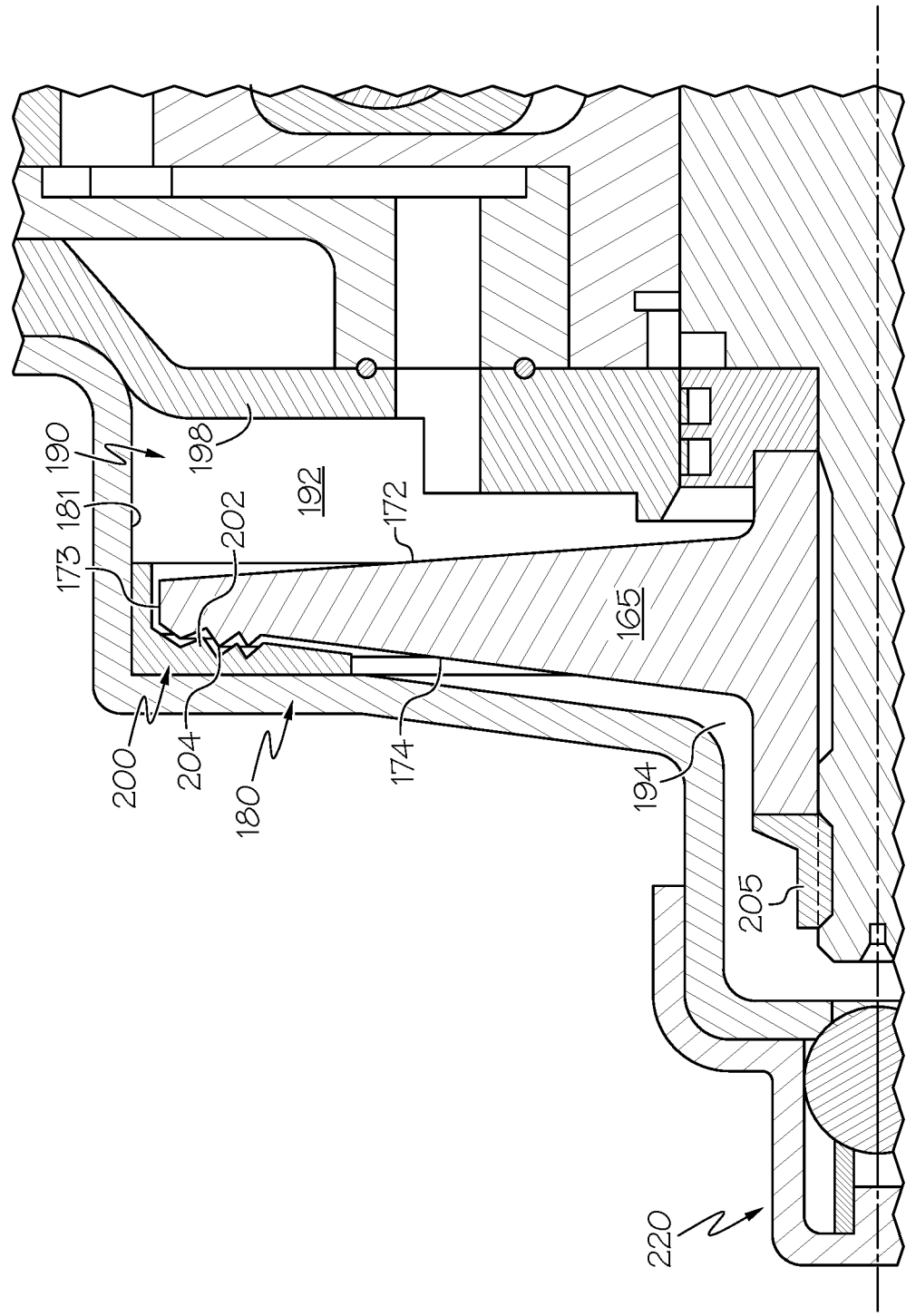
FIG. 4 is a detail section view of the charging device of FIG. 1.

As shown in FIG. 4, the balancing disc 165 may substantially divide the chamber 190 into a first sub-chamber 192 and a second sub-chamber 194. Specifically, as shown in FIG. 4, the radial area 173 and back face 174 of the disc 165 may be closely adjacent and may oppose a portion of the inner surface 181 of the thrust suppression housing 180. Furthermore, the charging device 102 may include at least one sealing member 200 that substantially seals a boundary between the first sub-chamber 192 and the second sub-chamber 194. The sealing member 200 may include a labyrinth seal between the inner surface 181 and the outer surface 171 of the disc 165 in some embodiments. The sealing member 200 may include ridges 202, and the back face 174 of the balancing disc 165 may include corresponding ridges 204. The sealing member 200 may seal to the back face 174 and the ridges 202, 204 may interact to define a tortuous path for bleed air flow from the first sub-chamber 192 to the second sub-chamber 194 as will be discussed. Accordingly, the front face 172 of the disc 165, the second end plate 198, and the inner surface 181 of the thrust suppression housing 180 may collectively define the first sub-chamber 192. The back face 174 of the disc 165, the sealing member 200, the inner surface 181 of the thrust suppression housing 180 and the nut 205 may collectively define the second sub-chamber 194.

It will be understood that the housing 119 and/or other portions of the charging device 102 may include a number of additional components, which are not described in detail. For example, the housing 119 may include a number of fasteners, fluid seals, heat shielding, and/or other components for maintaining efficient and effective operations of the charging device 102.

Referring now to FIGS. 2 and 3, the feed line 164 of the bleed air system 162 will be discussed according to example embodiments. As represented in FIG. 2, there may be a plurality of (e.g., eight) feed lines 164, which are spaced apart evenly in a circumferential direction about the axis 120. The feed lines 164 may be respectively defined by a through-hole 210 or other aperture that extends through the thickness of the first bearing housing 186 (FIGS. 2 and 3). The feed line 164 may also be respectively defined by a longitudinal passage 212 (FIG. 3), which is aligned with one of the through-holes 210 and that extends axially through the motor casing 144. Furthermore, the feed line 164 may be defined by a thin, radial gap 214 that is defined between the second bearing housing 196 and the first end plate 191. Additionally, the feed line 164 may be respectively defined by a first end passage 216 through the first end plate 191 and an aligned second end passage 218 through the second end plate 198. Accordingly, as represented in FIG. 3, at least one of the feed lines 164 may be fluidly continuous, and may extend from the diffuser area 179 of the compressor section 110, longitudinally through the hole 210 and the longitudinal passage 212, radially through the gap 214, and longitudinally through the first end passage 216 and the second end passage 218 to the first sub-chamber 192 of the load suppression section 160. In other words, the feed line 164 may include a first longitudinal segment (the hole 210 and the longitudinal passage 212), a radial segment (the gap 214), and a second longitudinal segment (the aligned first and second end passages 216, 218), wherein the radial segment fluidly connects the first and second longitudinal segments.

Figure 5:
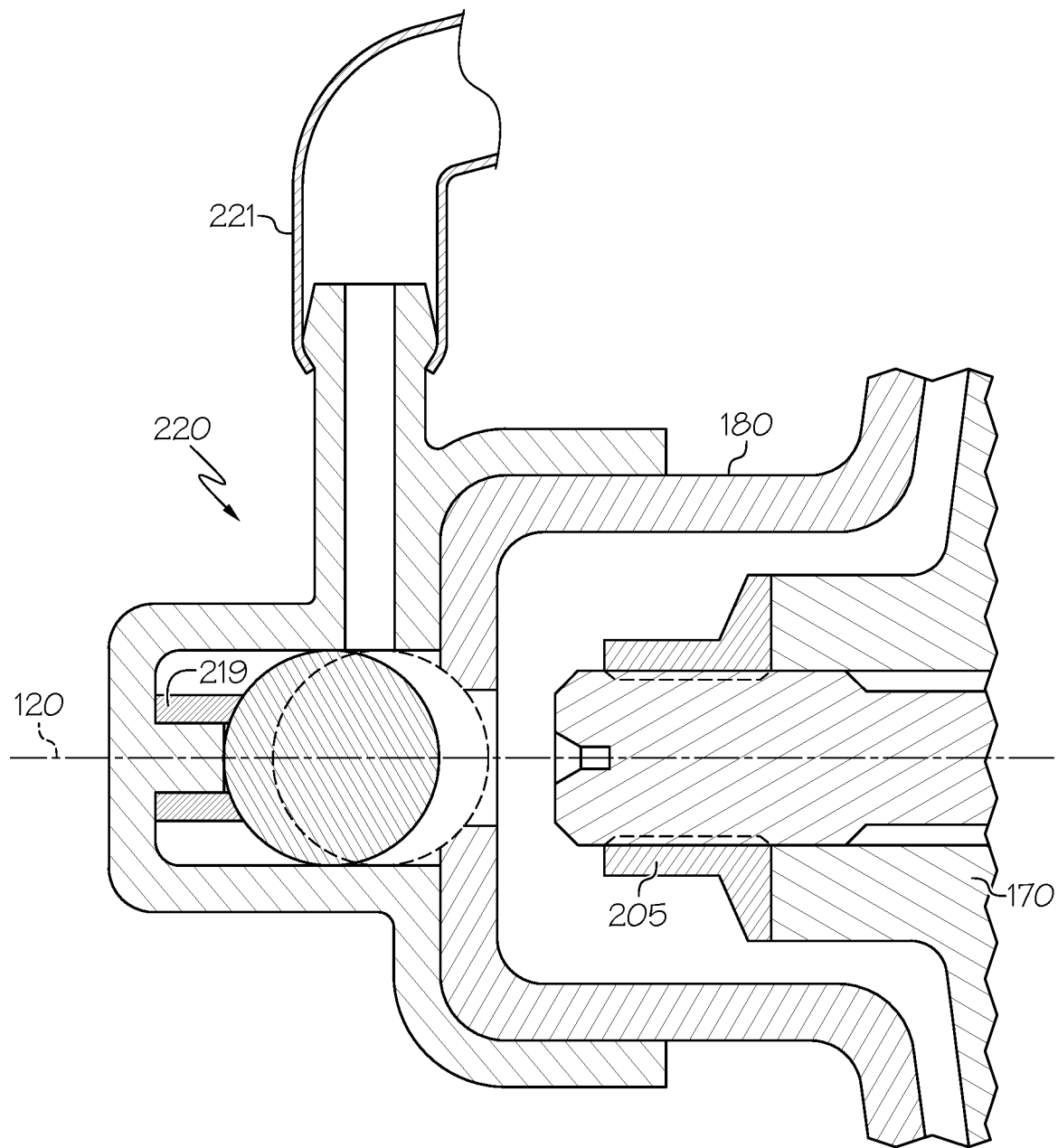
FIG. 5 is a detail section view of the charging device of FIG. 1.

Referring now to FIG. 1, the return line 166 of the bleed air system 162 will be discussed according to example embodiments. As shown, the return line 166 may include a tube 221 that bends and extends along the outside of the motor casing 144 and the compressor housing member 136. The return line 166 may also include a valve member 220 that regulates flow of the bleed air from the second sub-chamber 194 back to the compressor section 110. As shown in FIG. 5, the valve member 220 may be a one-way valve that is centered on the axis 120 and that is attached to the thrust suppression housing 180. Thus, the valve member 220 may be fluidly connected to the second sub-chamber 194. The valve member 220 may be biased toward a closed position (shown in phantom lines in FIG. 5) by a biasing member 219. The valve member 220 may move from the closed position against the biasing force from the biasing member 219 to an open position (shown in solid lines in FIG. 5) under the force of pressure within the second sub-chamber 194. As will be discussed, the valve member 220 may move from the closed position toward the open position when the second sub-chamber 194 is pressurized to a predetermined level.

The tube 221 may also be fixed proximate the compressor section inlet 138 to an inlet fixture 223 of the compressor section 110 (FIG. 1). The inlet fixture 223 may be connected to an inlet manifold 225, which is an annular chamber that encircles the inlet 138 of the compressor housing member 136 and that is fluidly connected to the inlet 138. Additionally, the inlet 138 may include one or more nozzles 227 that direct the return bleed airflow from the inlet manifold 225 and back into the inlet 138 of the compressor section 110.

Thus, during operation of the charging device 102, the inlet airstream 122 may be directed into the inlet 138. The compressor section 110 may compress the airstream 122 and feed the compressed airstream 124 to the intercooler 128 and to the fuel cell stack 104. Meanwhile, bleed air from the diffuser area 179 may bleed through the through-holes 210 and the longitudinal passages 212 into the gap 214. Bleed air in the gap 214 may flow through the first end passage 216 and the second end passage 218 into the first sub-chamber 192 of the load suppression section 160.

This bleed air may pressurize the first sub-chamber 192 (i.e., the high-pressure chamber) due to the sealing at the sealing member 200. The bleed air may eventually flow through the labyrinthine sealing member 200 to the second sub-chamber 194 (i.e., the low-pressure chamber). Eventually, pressure in the second sub-chamber 194 may rise high enough to open the valve member 220, thereby allowing the bleed air to flow back through the tube 221 to the inlet 138 of the compressor section 110.

It will be appreciated that there may be a pressure gradient between the first sub-chamber 192 and the second sub-chamber 194. The first sub-chamber 192 may be configured to be pressurized higher than the second sub-chamber 194. Also, pressure in the first sub-chamber 192 may load the balancing disc 165 and may tend to generate a thrust load directed in an axial direction away from the motor section 112 (to the left in FIGS. 1 and 3). This thrust load may counteract and balance thrust load generated at the compressor wheel 130. Accordingly, the rotating group 118 may maintain balanced rotation without significant overall thrust loads. As such, the bearing(s) 121 may be relatively light-duty bearings, such as air bearings, without compromising operation of the charging device 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor device comprising:
    a housing;
    a shaft supported for rotation within the housing;
    a compressor section with a compressor wheel that is fixed to the shaft for rotation therewith;

a thrust suppression section with a chamber, a thrust balance body disposed within the chamber, and a sealing member, the thrust balance body being fixed to the shaft for rotation therewith;
a motor configured to drivingly rotate the shaft, the compressor wheel, and the thrust balance body within the housing about an axis;
the thrust balance body having a back face and a radial area the thrust balance body dividing the chamber into a first sub-chamber and a second sub-chamber, the sealing member sealing between the radial area and the back face of the thrust balance body; and
a bleed air system fluidly connecting the compressor section and the thrust suppression section and configured to bleed air from the compressor section, through the first sub-chamber, to the second sub-chamber, pressurizing the first sub-chamber and generating a counterbalancing thrust load that counterbalances a compressor thrust load on the shaft.

2. The compressor device of claim 1, wherein the motor is included in a motor section of the compressor device, the motor section being disposed between the compressor section and the thrust suppression section.

3. The compressor device of claim 2, wherein the housing includes a motor housing that houses the motor, and wherein the bleed air system includes a feed line extending through the motor housing to fluidly connect the compressor section to the first sub-chamber of the thrust suppression section.

4. The compressor device of claim 3, wherein the feed line includes a first longitudinal segment, a second longitudinal segment, and a radial segment that fluidly connects the first and second longitudinal segments.

5. The compressor device of claim 1, wherein the bleed air system includes a return line that fluidly connects the second sub-chamber of the thrust suppression section to the compressor section.

6. The compressor device of claim 5, further comprising a valve that regulates flow of the bleed air from the second sub-chamber and back to the compressor section.

7. The compressor device of claim 6, wherein the valve is a one-way valve that is biased toward a closed position; and
wherein the one-way valve is configured to move from the closed position toward an open position when the second sub-chamber is pressurized to a predetermined level.

8. The compressor device of claim 5, wherein the return line is connected to an inlet manifold that is fluidly connected to an inlet of the compressor section; and
wherein the inlet includes a plurality of nozzles configured to direct return airflow from the inlet manifold and back into the inlet of the compressor section.

9. The compressor device of claim 1, wherein the housing includes a motor housing that houses the motor, and wherein the bleed air system includes a feed line that at least partly extends through the housing to fluidly connect a diffuser area of the compressor section to the first sub-chamber; and
wherein the feed line includes a longitudinal segment extending along the axis and spaced radially outward from the motor with respect to the axis.

10. The compressor device of claim 1, wherein the sealing member includes
a labyrinth seal defining a tortuous path for bleed air to flow from the first sub-chamber to the second sub-chamber.

11. The compressor device of claim 1, wherein the bleed air system includes a plurality of feed lines that fluidly connect the compressor section to the first sub-chamber of the thrust suppression section; and
wherein the plurality of feed lines is spaced apart in a circumferential direction about an axis of rotation of the shaft.

12. The compressor device of claim 1, further comprising an air bearing that supports rotation of the shaft within the housing.

13. The compressor device of claim 12, wherein the compressor section is a sole compressor section of the compressor device.

14. The compressor device of claim 1, wherein the bleed air system includes a plurality of feed lines that extend internally through the housing to fluidly connect the compressor section to the first sub-chamber of the thrust suppression section; and
wherein the plurality of feed lines are spaced apart in a circumferential direction about the axis.

15. A single-stage, motorized centrifugal compressor device comprising:
a housing;
a rotating group that includes a shaft, a compressor wheel fixed to the shaft, and a thrust balance body fixed to the shaft;
an air bearing that supports rotation of the rotating group within the housing about an axis;
a motor that drives rotation of the rotating group within the housing;
a bleed air system; and
a sealing member;
the housing and the compressor wheel cooperatively defining a compressor section of the compressor device;
the housing, the thrust balance body, and the sealing member cooperatively defining a thrust suppression section of the compressor device and cooperatively defining a chamber within the thrust suppression section, the thrust balance body having a back face and a radial area, the thrust balance body dividing the chamber into a first sub-chamber and a second sub-chamber, the sealing member sealing between the radial area and the back face of the thrust balance body; and
the bleed air system fluidly connecting the compressor section and the first sub-chamber, the bleed air system configured to bleed air from the compressor section and pressurize the first sub-chamber and apply a counterbalancing thrust load on the thrust balance body, the counterbalancing thrust load counterbalancing a compressor thrust load on the rotating group.

16. The compressor device of claim 15, wherein the motor is included in a motor section of the compressor device, the motor section being disposed between the compressor section and the thrust suppression section;
wherein the housing includes a motor housing that houses the motor in the motor section; and
wherein the bleed air system includes a feed line extending through the motor housing to fluidly connect the compressor section to the first sub-chamber of the thrust suppression section.

17. The compressor device of claim 16, wherein the feed line includes a first longitudinal segment, a second longitudinal segment, and a radial segment that fluidly connects the first and second longitudinal segments.

18. The compressor device of claim 16, wherein the bleed air system includes a return line that fluidly connects the second sub-chamber of the thrust suppression section to an inlet of the compressor section.

19. The compressor device of claim 18, further comprising a valve that regulates flow of the bleed air from the second sub-chamber and back to the compressor section.

20. The compressor device of claim 15, wherein the bleed air system includes a plurality of feed lines that extend internally through the housing to fluidly connect the compressor section to the first sub-chamber of the thrust suppression section; and wherein the plurality of feed lines are spaced apart in a circumferential direction about the axis.

\* \* \* \* \*